US009653198B2

(12) United States Patent
Horiuchi et al.

(10) Patent No.: US 9,653,198 B2
(45) Date of Patent: May 16, 2017

(54) PERMANENT MAGNET AND MANUFACTURING METHOD THEREOF, AND MOTOR AND GENERATOR USING THE SAME

(75) Inventors: Yosuke Horiuchi, Tokyo (JP); Shinya Sakurada, Shinagawa-ku (JP); Tsuyoshi Kobayashi, Kawasaki (JP); Keiko Okamoto, Kawasaki (JP); Masaya Hagiwara, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/423,535

(22) Filed: Mar. 19, 2012

(65) Prior Publication Data

US 2013/0076184 A1 Mar. 28, 2013

(30) Foreign Application Priority Data

Sep. 27, 2011 (JP) ................................ 2011-210123

(51) Int. Cl.

| | |
|---|---|
| ***H02K 21/00*** | (2006.01) |
| ***H01F 7/02*** | (2006.01) |
| ***B22F 3/24*** | (2006.01) |
| ***H01F 1/059*** | (2006.01) |
| ***C22C 30/02*** | (2006.01) |
| ***B22F 3/02*** | (2006.01) |

(Continued)

(52) U.S. Cl.

CPC .............. *H01F 1/0596* (2013.01); *B22F 3/02* (2013.01); *B22F 3/10* (2013.01); *B22F 3/24* (2013.01); *C22C 1/04* (2013.01); *C22C 30/02* (2013.01); *H01F 41/0273* (2013.01); *B22F 2003/248* (2013.01); *B22F 2998/10* (2013.01)

(58) Field of Classification Search

USPC ......................................... 148/101–103, 303

See application file for complete search history.

(56) References Cited

U.S. PATENT DOCUMENTS

| | | | |
|---|---|---|---|
| 4,746,378 | A | 5/1988 | Wysiekierski et al. |
| 2009/0261774 | A1 | 10/2009 | Yuuki et al. |

(Continued)

FOREIGN PATENT DOCUMENTS

| | | | |
|---|---|---|---|
| CN | 102047536 | | 5/2011 |
| CN | 102209796 | A | 10/2011 |

(Continued)

OTHER PUBLICATIONS

Huang et al. J of Applied Physics, 1994, vol. 75, p. 6280-6282.*

(Continued)

*Primary Examiner* — Jie Yang
*Assistant Examiner* — Xiaowei Su
(74) *Attorney, Agent, or Firm* — Oblon, McClelland, Maier & Neustadt, L.L.P.

(57) ABSTRACT

In one embodiment, a permanent magnet includes a composition represented by $R_pFe_qM_rCu_sCo_{100-p-q-r-s}$ (R: rare earth element, M: at least one element selected from Zr, Ti and Hf, 10≤p≤13.5 atomic %, 28≤q≤40 atomic %, 0.88≤r≤7.2 atomic %, 4≤s≤13.5 atomic %), and a metallic structure in which a composition region having an Fe concentration of 28 mol % or more is a main phase. A Cu concentration in the main phase is 5 mol % or more.

13 Claims, 5 Drawing Sheets

(51) Int. Cl.

| | |
|---|---|
| ***B22F 3/10*** | (2006.01) |
| ***C22C 1/04*** | (2006.01) |
| ***H01F 41/02*** | (2006.01) |

(56) References Cited

U.S. PATENT DOCUMENTS

| | | | | |
|---|---|---|---|---|
| 2011/0278976 A1* | 11/2011 | Horiuchi et al. | ............. | 310/152 |
| 2012/0074804 A1* | 3/2012 | Horiuchi et al. | ............. | 310/152 |
| 2012/0146444 A1* | 6/2012 | Horiuchi et al. | ............. | 310/152 |
| 2013/0241333 A1* | 9/2013 | Horiuchi et al. | ............. | 310/152 |

FOREIGN PATENT DOCUMENTS

| | | | | |
|---|---|---|---|---|
| EP | 2 048 772 | A1 | | 4/2009 |
| JP | 6-212327 | | | 8/1994 |
| JP | 9-111383 | | | 4/1997 |
| JP | 2008-29148 | | | 2/2008 |
| JP | 2008-43172 | | | 2/2008 |
| JP | 2010-121167 | | | 6/2010 |
| JP | 2010123722 | A | * | 6/2010 |
| WO | WO 2010/058555 | A1 | | 5/2010 |

OTHER PUBLICATIONS

Liu et al. (IEEE Transactions on Magnetics, 1989, vol. 25, No. 5, p. 3785-3787).*

Machine trnaslation of JP2010-123722 A. 06-1020.*

Chinese Office Action issued Nov. 24, 2014 in connection with corresponding Chinese Patent Application No. 201210067400.5, filed Mar. 6, 2012.

* cited by examiner

PERMANENT MAGNET AND MANUFACTURING METHOD THEREOF, AND MOTOR AND GENERATOR USING THE SAME

CROSS-REFERENCE TO RELATED APPLICATION

This application is based upon and claims the benefit of priority from Japanese Patent Application No. 2011-210123, filed on Sep. 27, 2011; the entire contents of which are incorporated herein by reference.

FIELD

Embodiments described herein relate generally to a permanent magnet and a manufacturing method thereof, and a motor and a generator using the same.

BACKGROUND

As a high-performance permanent magnet, rare earth magnets such as Sm—Co based magnets and Nd—Fe—B based magnets are known. When permanent magnets are used in motors for hybrid vehicles (HEV) and electric vehicles (EV), heat resistance of permanent magnets is demanded. In motors for HEV and EV, there are used permanent magnets whose heat resistance is increased by replacing a part of Nd in the Nd—Fe—B based magnets with Dy. Since Dy is one of rare elements, permanent magnets not using Dy are desired. As a motor and a generator with high efficiency, a variable magnetic flux motor and a variable magnetic flux generator using a variable magnet and a stationary magnet, are known. In order to achieve high performance and high efficiency of the variable magnetic flux motor and the variable magnetic flux generator, increase in coercive force and magnetic flux density of the variable magnet and the stationary magnet is demanded.

The Sm—Co based magnets have high Curie temperature, and thus they are known that they exhibit excellent heat resistance without using Dy, and they can realize good motor characteristics at a high temperature. Among the Sm—Co based magnets, $Sm_2Co_{17}$ type magnets can also be used as variable magnets based on a coercive force exertion mechanism thereof. The Sm—Co based magnets are also required to increase coercive force and magnetic flux density. For realization of high magnetic flux density of the Sm—Co based magnets, increase in Fe concentration is effective, but the coercive force tends to decrease in a composition region having high Fe concentration. Therefore, there is desired a technique to allow exertion of large coercive force in Sm—Co based magnets with high Fe concentration.

DETAILED DESCRIPTION

Figure 1:
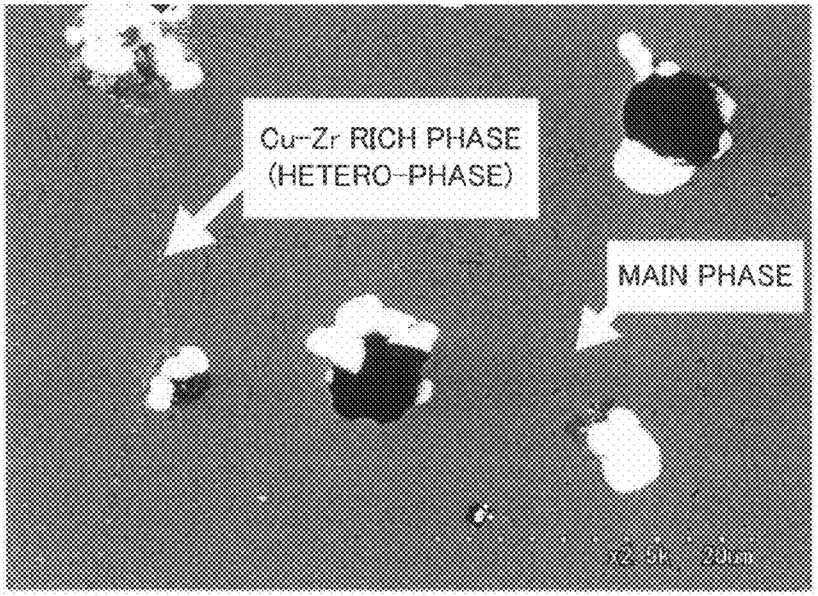
FIG. 1 is an SEM image illustrating a metallic structure of a permanent magnet of an embodiment.

According to one embodiment, there is provided a permanent magnet having a composition represented by composition formula:

$$R_pFe_qM_rCu_sCo_{100-p-q-r-s} \quad (1)$$

where R is at least one element selected from rare earth elements, M is at least one element selected from Zr, Ti and Hf, p is a number satisfying $10 \le p \le 13.5$ atomic %, q is a number satisfying $28 \le q \le 40$ atomic %, r is a number satisfying $0.88 \le r \le 7.2$ atomic %, and s is a number satisfying $4 \le s \le 13.5$ atomic %. The permanent magnet of the embodiment includes a metallic structure in which a composition region having an Fe concentration of 28 mol % or more is a main phase. A Cu concentration in the main phase is set to 5 mol % or more.

Hereinafter, the permanent magnet of the embodiment will be described in detail. In the composition formula (1), at least one element selected from rare earth elements including yttrium (Y) is used as the element R. The element R brings about large magnetic anisotropy in the permanent magnet, and gives high coercive force. As the element R, at least one element selected from samarium (Sm), cerium (Ce), neodymium (Nd) and praseodymium (Pr) is preferably used, and it is particularly desirable to use Sm. When 50 atomic % or more of the element R is Sm, it is possible to enhance the performance, especially the coercive force of the permanent magnet with good repeatability. Further, it is desirable that 70 atomic % or more of the element R is Sm.

The content p of the element R is in a range of 10 to 13.5 atomic %. When the content p of the element R is less than 10 atomic %, a large amount of α-Fe phase precipitates, and sufficient coercive force cannot be obtained. On the other hand, when the content of the element R exceeds 13.5 atomic %, saturation magnetization significantly decreases. The content p of the element R is preferably in a range of 10.3 to 13 atomic %, and is more preferably in a range of 10.5 to 12.5 atomic %.

Iron (Fe) is an element which mainly bears magnetization of the permanent magnet. It is possible to enhance the saturation magnetization of the permanent magnet when a large amount of Fe is contained. However, when Fe is contained too much, coercive force may decrease because α-Fe phase precipitates and because it becomes difficult to obtain a desired two-phase structure which will be described later. For this reason, the content q of Fe is set to be in a range of 28 to 40 atomic %. The content q of Fe is preferably in a range of 29 to 38 atomic %, and is more preferably in a range of 30 to 36 atomic %.

As the element M, at least one element selected from titanium (Ti), zirconium (Zr) and hafnium (Hf) is used. By compounding the element M, it is possible to realize exertion of large coercive force in a composition with high Fe concentration. The content r of the element M is in a range of 0.88 to 7.2 atomic %. By setting the content r of the element M to 0.88 atomic % or more, it is possible to make a permanent magnet having a composition with high Fe concentration exert large coercive force. On the other hand, when the content r of the element M exceeds 7.2 atomic %, magnetization decreases significantly, and it becomes difficult to generate a later-described Cu-M rich phase. The content r of the element M is preferably in a range of 1.3 to 4.3 atomic %, and is more preferably in a range of 1.5 to 2.6 atomic %.

The element M may be any one of Ti, Zr, and Hf, but preferably contains at least Zr. In particular, by having the element M with 50 atomic % or more of Zr, effect of increasing coercive force of the permanent magnet can be further improved. Meanwhile, Hf in element M is particularly expensive, so that even in a case of using Hf, it is preferred that the amount of using Hf be small. It is preferable that the content of Hf is set to less than 20 atomic % of the element M.

Copper (Cu) is an element for allowing the permanent magnet to exert high coercive force. The compounding amount s of Cu is in a range of 4 to 13.5 atomic %. When the compounding amount s of Cu is less than 4 atomic %, it becomes difficult to attain high coercive force. Further, it becomes difficult to set the Cu concentration in the main phase to 5 mol % or more. When the compounding amount s of Cu is set to 4 atomic % or more, by generating a hetero-phase with a small amount of Cu, the Cu concentration in the main phase can be set to 5 mol % or more. The same applies to the generation of Cu-M rich phase. On the other hand, when the compounding amount s of Cu exceeds 13.5 atomic %, magnetization decreases significantly. The compounding amount of Cu is preferably in a range of 4.2 to 9 atomic %, and is more preferably in a range of 4.5 to 7.2 atomic %.

Cobalt (Co) is an element responsible for magnetization of the permanent magnet and necessary for allowing the magnet to exert high coercive force. Further, when a large amount of Co is contained, Curie temperature becomes high, and thermal stability of the permanent magnet is improved. When the content of Co is too small, these effects cannot be sufficiently achieved. However, when the content of Co is too large, a content ratio of Fe decreases relatively, which causes decrease in magnetization. Therefore, the content of Co is set so that the content of Fe satisfies the aforementioned range, after taking the contents of the element R, the element M and Cu into consideration.

A part of Co may be replaced with at least one element A selected from nickel (Ni), vanadium (V), chrome (Cr), manganese (Mn), aluminum (Al), gallium (Ga), niobium (Nb), tantalum (Ta) and tungsten (W). These replacement elements A contribute to improvement of magnetic characteristics, for example, coercive force. However, excessive replacement of Co with the element A may cause decrease in magnetization, and thus the amount of replacement by the element A is preferably set to 20 atomic % or less of Co.

In the permanent magnet of this embodiment, the composition region having the Fe concentration of 28 mol % or more is set to the main phase. Further, the Cu concentration in the main phase is set to 5 mol % or more. Here, generally, the coercive force exertion mechanism of Sm—Co based magnets is known to be a magnetic domain wall pinning type. An $Sm_2Co_{17}$ type magnet obtains the coercive force exertion mechanism of magnetic domain wall pinning type by phase-separating, through heat treatment, the main phase into a $Th_2Zn_{17}$ crystal phase (crystal phase having a $Th_2Zn_{17}$ type structure/2-17 phase) and a $CaCu_5$ crystal phase (crystal phase having a $CaCu_5$ type structure/1-5 phase). A metallic structure after conducting the phase separation has a secondary structure called a cell structure. Specifically, the 1-5 phase (cell wall phase) precipitates as a grain boundary phase of the 2-17 phase (cell phase), resulting in that a structure in which the cell phase is divided by the cell wall phase is made.

A magnetic domain wall energy of the 1-5 phase (cell wall phase) precipitated into the grain boundary of the 2-17 phase (cell phase) is larger than a magnetic domain wall energy of the 2-17 phase, and a difference between the magnetic domain wall energies becomes a barrier against magnetic domain wall displacement. Specifically, the 1-5 phase having the large magnetic domain wall energy works as a pinning site, the coercive force of magnetic domain wall pinning type is considered to be exerted. It can be considered that the difference between the magnetic domain wall energies is generated mainly by a concentration difference of Cu. If a Cu concentration in the cell wall phase (grain boundary phase) is higher than a Cu concentration in the cell phase, it is conceivable that sufficient coercive force is exerted.

As described above, Cu is the essential element for making the $Sm_2Co_{17}$ type magnet exert high coercive force. Specifically, it is conceivable that Cu is enriched in the cell wall phase (grain boundary phase) generated through heat treatment, which makes the cell wall phase work as the pinning site of magnetic domain wall, resulting in that the coercive force is exerted. However, when the Fe concentration in the $Sm_2Co_{17}$ type magnet becomes high, such coercive force tends to be difficult to be exerted. It is conceivable that the cause thereof is that when the Fe concentration becomes high, the phase separation of the main phase into the 2-17 phase and the 1-5 phase does not sufficiently proceed during the heat treatment (during aging treatment).

As a result of conducting earnest studies on the cause, the present inventors found out that, in a composition region with high Fe concentration, a Cu concentration in a main phase of a sintered body magnet tends to be lower than a given Cu concentration. Specifically, the present inventors found out that even if Cu is added for the purpose of improving the coercive force, Cu is not contained sufficiently in the main phase. It is conceivable that, in the $Sm_2Co_{17}$ type magnet, the cell wall phase does not sufficiently function as the magnetic domain wall pinning site unless there appears a sufficient Cu concentration difference between the cell phase and the cell wall phase formed during the aging treatment. When a sufficient Cu amount is not secured in the main phase, it becomes difficult to provide the sufficient Cu concentration difference between the cell phase and the cell wall phase, or the phase separation itself becomes difficult to occur, which is conceivable to prevent the exertion of coercive force.

As a result of conducting earnest investigation and studies on this point, it was found out that sufficient coercive force can be obtained by setting the Cu concentration in the main phase to 5 mol % or more. Specifically, in the permanent magnet having the composition region with high Fe concentration as the main phase, particularly, in the permanent magnet having the composition region with the Fe concentration of 28 mol % or more as the main phase, a hetero-phase in which Cu and the element M are rich becomes easily precipitated. As such hetero-phase, there can be cited a phase in which the Cu concentration is 5 mol % or more, the concentration of the element M is 3 mol % or more, and the balance is the element R, Fe and Co (Cu-M rich phase). It is conceivable that the Cu concentration in the main phase decreases when Cu is enriched in the Cu-M rich phase.

Specifically, by suppressing the generation of Cu-M rich phase, it is possible to keep the Cu concentration in the main phase at 5 mol % or more.

As described above, the permanent magnet of this embodiment is structured to be able to keep the Cu concentration in the main phase in which the Fe concentration is 28 mol % or more, at 5 mol % or more, by suppressing the generation of Cu-M rich phase. According to the main phase in which the Cu concentration is 5 mol % or more, the phase separation into the cell phase (2-17 phase) and the cell wall phase (1-5 phase or the like) sufficiently proceeds during the aging treatment, and at the same time, it is possible to generate a sufficient Cu concentration difference between the cell phase and the cell wall phase. It is possible to give sufficient coercive force based on the aforementioned coercive force exertion mechanism of magnetic domain wall pinning type, to the Sm—Co based magnet in which magnetization is improved based on the main phase having the Fe concentration of 28 mol % or more.

The Cu-M rich phase (hetero-phase) is conceivable to be generated from a phase in which the element M, which is Zr, in particular, is rich, generated at the time of making an alloy ingot as a starting phase. The M-rich phase generated at the time of making the alloy ingot has a low melting point, so that when the alloy ingot including such phase is pulverized using a jet mill, ball mill, or the like, the pulverized powder includes M-rich low melting fine powder. When the low melting M-rich phase turns into a liquid phase during sintering, Cu tends to be concentrated in the liquid phase, so that the Cu-M rich phase is generated in a sintered body. Accordingly, it is conceivable that the Cu concentration in the main phase decreases. Therefore, by sintering a pressed powder body of alloy powder at a temperature lower than a melting start temperature $T_M$ of the low melting M-rich phase, an amount of Cu-M rich phase in the sintered body can be reduced. A sintering temperature of the pressed powder body of alloy powder will be described later in detail.

Figure 3:
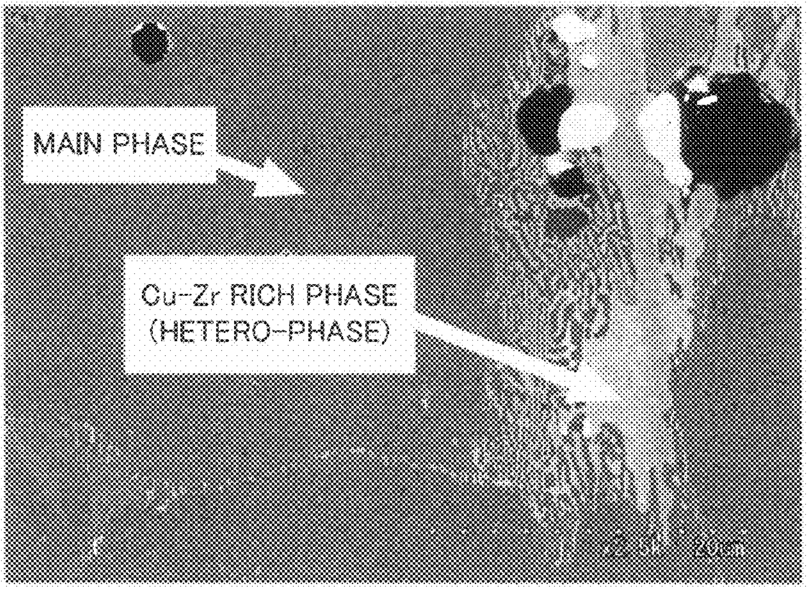
FIG. 3 is an SEM image illustrating a metallic structure of a conventional permanent magnet.
Figure 4:
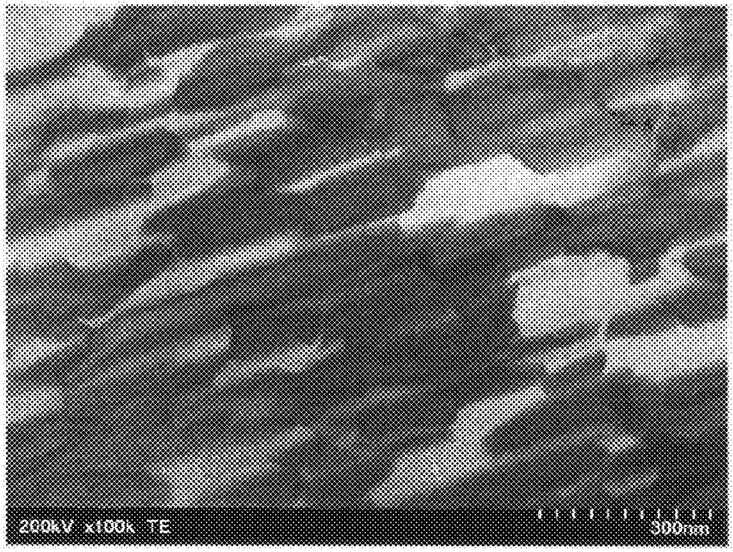
FIG. 4 is a TEM image illustrating a fine structure of main phase in the permanent magnet illustrated in FIG. 3.

FIG. 3 is an SEM image (scanning electron microscope image) illustrating a metallic structure of a conventional Sm—Co based magnet. As is apparent from FIG. 3, it can be understood that the conventional Sm—Co based magnet includes a relatively large amount of Cu-M rich phase (Cu—Zr rich phase), in addition to a main phase having an Fe concentration of 28 mol % or more. For this reason, a Cu concentration in the main phase decreases. FIG. 4 is a TEM image (transmission electron microscope image) illustrating a fine structure of the main phase of the permanent magnet illustrated in FIG. 3. As is apparent from FIG. 4, it can be understood that when heat treatment is applied to a sintered body including a large amount of Cu-M rich phase, two-phase separation proceeds insufficiently. For this reason, sufficient coercive force cannot be obtained.

Figure 2:
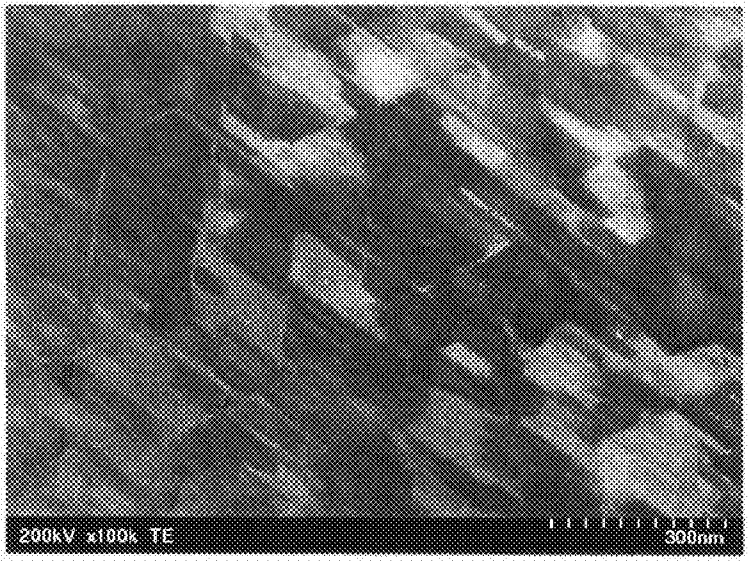
FIG. 2 is a TEM image illustrating a fine structure of main phase in the permanent magnet illustrated in FIG. 1.

FIG. 1 is an SEM image illustrating a metallic structure of the Sm—Co based magnet of this embodiment. As is apparent from FIG. 1, by controlling a sintering temperature of pressed powder body, for example, it is possible to suppress precipitation of Cu-M rich phase (Cu—Zr rich phase). Accordingly, it becomes possible to set the Cu concentration in the main phase to 5 mol % or more. FIG. 2 is a TEM image illustrating a fine structure of the main phase of the permanent magnet illustrated in FIG. 1. As is apparent from FIG. 2, it can be understood that when heat treatment is applied to a sintered body in which the precipitation of Cu-M rich phase is suppressed, two-phase separation of the main phase proceeds sufficiently. Therefore, it becomes possible to give large coercive force to the Sm—Co based magnet.

The precipitation of Cu-M rich phase (hetero-phase) into the metallic structure of the Sm—Co based magnet should be avoided in order to keep the Cu concentration in the main phase. However, it is preferable that a very small amount of Cu-M rich phase is included as long as the amount is within a range satisfying a condition in which the Fe concentration in the main phase of the sintered body is 28 mol % or more and the Cu concentration is 5 mol % or more. When the Cu-M rich phase exists in the grain boundary of the cell phase, it prevents a crystal grain diameter from being coarse, and the Cu-M rich phase works as a pinning site of magnetic domain wall. Therefore, the Cu-M rich phase sometimes brings about improvement in magnetic characteristics such as coercive force.

The metallic structure of the Sm—Co based magnet preferably includes the Cu-M rich phase in which the Cu concentration is 5 mol % or more and the concentration of the element M is 3 mol % or more, so that a volume ratio of the Cu-M rich phase with respect to an entire phase structuring the metallic structure falls within a range of 0.01 to 5%. When the volume ratio of the Cu-M rich phase exceeds 5%, the Cu concentration in the main phase decreases significantly, and because of the aforementioned reason, the coercive force decreases. When the volume ratio of the Cu-M rich phase is less than 0.01%, the effect of improving the coercive force described above cannot be sufficiently obtained. It is more preferable that the volume fraction of the Cu-M rich phase with respect to the entire structure phase structuring the metallic structure falls within a range of 0.5 to 3.5%.

The metallic structure of the Sm—Co based magnet includes the main phase formed of the composition region in which the Fe concentration is 28 mol % or more and the Cu concentration is 5 mol % or more, and the hetero-phase such as the Cu-M rich phase. The metallic structure of the Sm—Co based magnet may also include a hetero-phase other than the Cu-M rich phase. The hetero-phase indicates a phase other than the main phase, out of the entire structure phase structuring the metallic structure. As the hetero-phase other than the Cu-M rich phase, there can be cited an $Sm_2(Co, Fe, Zr, Cu)_7$ phase, an $Sm(Co, Fe, Zr, Cu)_3$ phase, a $Zr_2(Fe, Co, Cu)_{11}$ phase and the like. However, when an amount of hetero-phase including Cu-M rich phase is too much, an amount of main phase relatively decreases, which may decrease the magnetic characteristics such as magnetization and coercive force, so that an entire amount of the hetero-phase is preferably set to 10% or less in a volume ratio.

The permanent magnet of this embodiment has a structure in which the main phase is separated into two phases of the cell phase (2-17 phase) and the cell wall phase (1-5 phase or the like) after the aging treatment. The cell wall phase preferably has a Cu concentration which is 1.2 times or more a Cu concentration in the 2-17 phase being the cell phase. Accordingly, it is possible to make the cell wall phase sufficiently function as a pinning site of magnetic domain wall. In other words, by setting the Cu concentration in the main phase to 5 mol % or more, the Cu concentration in the cell wall phase can be set to 1.2 times or more the Cu concentration in the cell phase, with good repeatability. However, when the Cu concentration in the cell wall phase is too high, the amount of generation of Cu-M rich phase decreases too much as described above, so that the Cu concentration in the cell wall phase is preferably 14 times or less, and is more preferably 10 times or less the Cu concentration in the cell phase.

As a typical example of the cell wall phase (grain boundary phase) that exists in the grain boundary of the cell phase, the aforementioned 1-5 phase can be cited, but, the example is not necessarily limited to this. When the cell wall phase has the Cu concentration which is 1.2 times or more the Cu concentration in the cell phase, it is possible to make the cell wall phase sufficiently function as the pinning site of magnetic domain wall. Therefore, the cell wall phase is only required to be a Cu-rich phase as described above. As the cell wall phase other than the 1-5 phase, there can be cited a $TbCu_7$ crystal phase (crystal phase having a $TbCu_7$ type structure/1-7 phase) being a high-temperature phase (structure before phase separation), a precursor phase of the 1-5 phase generated at an early stage of the two-phase separation of the 1-7 phase, and the like.

In the permanent magnet of this embodiment, the Fe concentration and the Cu concentration in the main phase, and the Cu concentration and the M concentration (Zr concentration or the like) in the Cu-M rich phase can be measured using an SEM-EDX (energy dispersive X-ray spectroscopy). The SEM-EDX observation is conducted with respect to an inside of the sintered body. The measurement of the inside of the sintered body is conducted in the following manner. First, in a center portion of the longest edge of a face having the largest area, a composition is measured in a surface portion and in an inner portion of a cross section cut perpendicular to the edge (perpendicular to a tangent at the center portion in a case of curve).

Regarding measurement points, there are provided a reference line 1 drawn from a position corresponding to ½ of each edge in the above-described cross section, as a starting point, to an end portion toward the inside perpendicular to the edge, and a reference line 2 drawn from a center of each corner portion, as a starting point, to an end portion toward the inside by passing through a position corresponding to ½ of an angle of interior angle of the corner portion, and a position corresponding to 1% of a length of the reference line from the starting point of each of these reference lines 1, 2 is defined as the surface portion, and a position corresponding to 40% of the length of the reference line from the starting point of each of these reference lines 1, 2 is defined as the inner portion. Note that when the corner portion is subjected to chamfering or the like to have a curvature, an intersection point between extended adjacent edges is set to the end portion of the edge (center of the corner portion). In this case, the measurement point is set to a position from a portion in which the corner portion intersects the reference line, not from the intersection point.

By setting the measurement points as above, when the cross section has a quadrangular shape, for example, the number of reference lines is eight, in total, in which the number of reference lines 1 and the number of reference lines 2 are respectively four, and thus the number of measurement points in the surface portion and that in the inner portion are respectively eight. In this embodiment, all of the eight points in the surface portion and those in the inner portion preferably have a composition that falls within the aforementioned composition range, but, it is only required that at least four points or more in the surface portion and those in the inner portion have a composition that falls within the aforementioned composition range. In this case, a relation between the surface portion and the inner portion in one reference line is not specified. After the observation face inside of the sintered body specified as above is polished to be smoothed, there is performed SEM observation at a magnification of ×2500. It is desirable to set an acceleration voltage to 20 kV. Observation positions in the SEM-EDX are set to any 10 to 20 points in a crystal grain, measurement is performed at each of these points to determine an average value, and the average value is set to a concentration of each element.

The volume ratio of the Cu-M rich phase can be defined by an area ratio of the Cu-M rich phase in a field of view in EPMA observation. The area ratio of the Cu-M rich phase can be determined in the following manner. First, a BSE image is photographed at a magnification of ×2500 using a field emission (FE) type EPMA. With the use of a commercially available image analysis software or the like, specific contrast extraction is performed on the photographed image using two threshold values, and then an area is calculated. In the contrast extraction, two certain "threshold values" are provided with respect to a luminance (brightness) of each pixel of the image, and regions are divided in a manner such that the region corresponds to "0" if the luminance is equal to or less than a threshold value A or it is equal to or more than a threshold value B, and the region corresponds to "1" if the luminance is not less than the threshold value A nor more than the threshold value B. As the threshold values, a minimum value and a maximum value of luminance in a distribution of luminance on which the extraction is tried to be performed are used, and a range of the values is selected. When the distribution of luminance is overlapped with that of another contrast, a minimum value and a maximum value of luminance in the both distributions of luminance are used as the threshold values, and a range of the values is selected.

The permanent magnet of this embodiment is manufactured in the following manner, for example. First, an alloy powder containing a predetermined amount of element is prepared. The alloy powder is prepared by making an alloy thin band in a flake shape by a strip casting method, for example, and pulverizing this thin band. In the strip casting method, it is preferable to tilt-pour an alloy molten metal into a chill roll rotating at a peripheral speed of 0.1 to 20 m/sec, to thereby obtain a thin band continuously solidified with a thickness of 1 mm or less. When the circumferential speed of the chill roll is lower than 1 m/sec, dispersion of the composition can easily occur in the thin band, and when the circumferential speed is over 20 m/sec, the crystal grains are refined to the size of a single magnetic domain or smaller, and favorable magnetic characteristics cannot be obtained. The circumferential speed of the chill roll is more preferably in a range of 0.3 to 15 m/sec, and is further preferably in a range of 0.5 to 12 m/sec.

The alloy powder may also be prepared by pulverizing an alloy ingot obtained by casting molten metal made by an arc melting method or high-frequency melting method. Other methods for preparing the alloy powder include mechanical alloying method, mechanical grinding method, gas atomizing method, reduction diffusion method, and the like, and an alloy powder prepared by these methods can also be used. The alloy powder obtained in this manner or the alloy before being pulverized may be subjected to heat treatment as necessary to homogenize it. Pulverization of the flake or the ingot is performed using a jet mill, ball mill, or the like. To prevent oxidization of the alloy powder, it is preferable that the pulverization is performed in an inert gas atmosphere or in an organic solvent.

Next, the alloy powder is filled in a metal mold placed in an electromagnet or the like, and pressure forming is performed while applying the magnetic field, thereby making a pressed powder body in which the crystal axis is oriented.

By sintering the pressed powder body under an appropriate condition, it is possible to obtain a sintered body having large coercive force. Specifically, by sintering the pressed powder body at a temperature $T_S$ which is lower than the melting start temperature $T_M$ of the low melting M-rich phase, it is possible to obtain a sintered body with a small amount of hetero-phase. However, when the sintering temperature $T_S$ is too low, a relative density of the sintered body cannot be sufficiently increased, resulting in that magnetization of the permanent magnet decreases.

For this reason, the sintering temperature $T_S$ of the pressed powder body is preferably set to a temperature which exceeds a temperature lower by 50° C. than the melting start temperature $T_M$ of the low melting M-rich phase ($T_M$-50° C.). Practically, a density of the sintered body that forms the permanent magnet is preferably set to 8.2 g/cm$^3$ or more. When the sintering temperature $T_S$ of the pressed powder body is set to fall within a temperature range in which the temperature exceeds the temperature lower by 50° C. than the melting start temperature $T_M$ of the M-rich phase ($T_M$-50° C.) and is lower than the melting start temperature $T_M$ of the M-rich phase ($T_M-50<T_S<T_M$ (° C.)), the high density is realized, and in addition to that, it is possible to obtain a sintered body with a small amount of hetero-phase such as the Cu-M rich phase, with good repeatability. The sintering temperature $T_S$ is more preferably set to a temperature equal to or higher than ($T_M$-40° C.), and further, it is desirable to set to a temperature equal to or higher than ($T_M$-20° C.).

The melting start temperature $T_M$ of the low melting M-rich phase can be determined using a differential thermal analysis. A shape of sample used in the differential thermal analysis is not necessarily a powder shape. Since it is conceivable that the low melting M-rich phase and the main phase are generated at the time of making the alloy, it is also possible to use the flake-shaped alloy thin band obtained by the strip casting method, the alloy ingot made by the arc melting, or the like.

Figure 5:
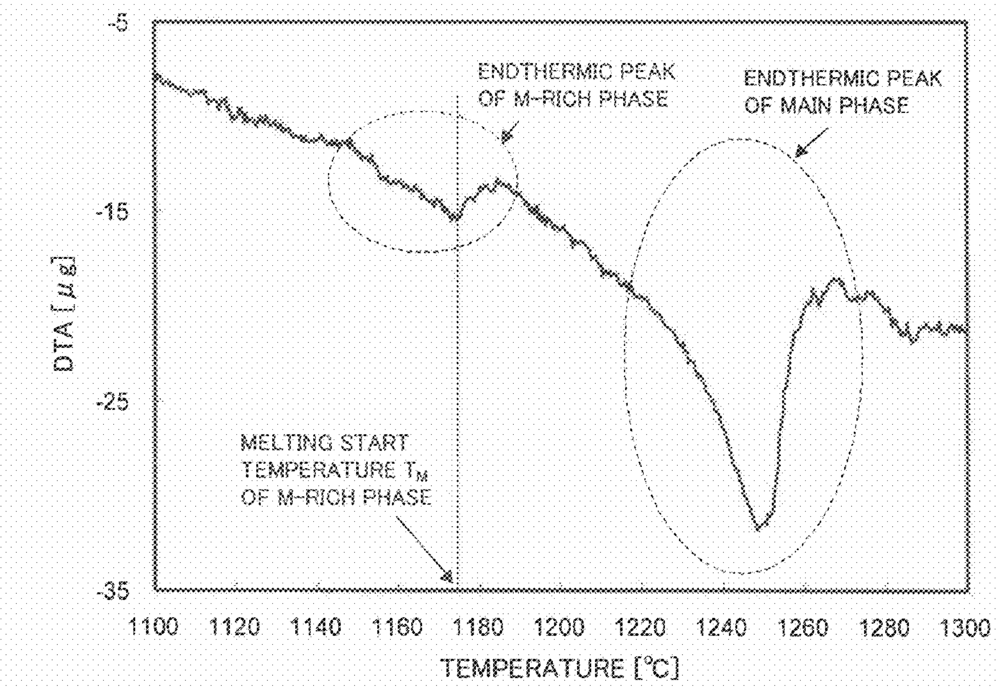
FIG. 5 is a diagram illustrating an example of a result of differential thermal analysis of alloy powder used in a manufacturing process of the permanent magnet according to the embodiment.

FIG. 5 illustrates an example of a result of differential thermal analysis of the alloy powder used for manufacturing the permanent magnet in this embodiment. In FIG. 5, the largest endothermic peak corresponds to an endothermic peak caused by melting of the main phase. On a low temperature side of the peak due to the endothermic reaction of the main phase, a peak smaller than the peak due to the endothermic reaction of the main phase, can be observed. This corresponds to an endothermic peak caused by melting of the M-rich phase. In the vicinity of a maximum temperature of the peak, the melting of the low melting M-rich phase significantly occurs. The maximum temperature of the endothermic peak due to the melting of the M-rich phase is defined as the melting start temperature $T_M$ of the M-rich phase.

Figure 6:
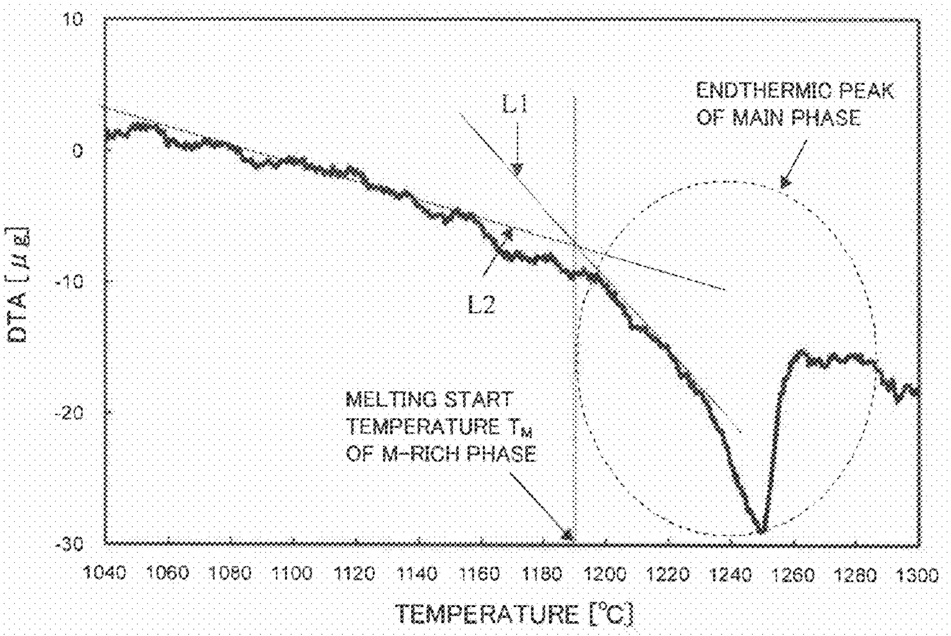
FIG. 6 is a diagram illustrating another example of the result of differential thermal analysis of alloy powder used in the manufacturing process of the permanent magnet according to the embodiment.

Note that there is a case that, depending on the composition of alloy, the melting point of the main phase and the melting point of the M-rich phase (low melting phase) are close, and a distinct endothermic reaction peak of the low melting phase cannot be detected. In such a case, an intersection point between a tangent at the largest rising of the endothermic peak (L1 in FIG. 6) and a tangent of background (L2 in FIG. 6) can be regarded as the melting start temperature $T_M$ of the M-rich phase. The endothermic peak due to the melting of main phase and the endothermic peak due to the melting of M-rich phase (Zr-rich phase or the like) generally fall within a temperature range of 1000° C. to 1300° C.

A sintering time at the aforementioned temperature is preferably set to 0.5 to 15 hours. This enables to obtain a fine sintered body. If the sintering time is less than 0.5 hours, the density of the sintered body becomes uneven. Further, if the sintering time exceeds 15 hours, Sm or the like in the alloy powder evaporates, and favorable magnetic characteristics may not be obtained. It is more preferable that the sintering time is 1 to 10 hours, and it is further preferable that the sintering time is 1 to 4 hours. It is preferable to perform sintering of the pressed powder body in a vacuum or in an inert gas atmosphere such as argon gas in order to prevent oxidation.

Next, solution treatment and aging treatment are performed on the obtained sintered body to control the crystal structure. It is preferable that in the solution treatment, the sintered body is heat-treated at a temperature in a range of 1100 to 1200° C. for 0.5 to 8 hours in order to obtain the 1-7 phase being a precursor of a phase separation structure. At a temperature less than 1100° C. and a temperature over 1200° C., a ratio of the 1-7 phase in a sample after the solution treatment is small, and favorable magnetic characteristics cannot be obtained. A solution treatment temperature is more preferably in a range of 1120 to 1180° C., and is further preferably in a range of 1120° C. to 1170° C.

If a solution treatment time is less than 0.5 hours, the structure phase easily becomes uneven. Further, if the solution treatment is performed for over 8 hours, the rare earth element such as Sm in the sintered body evaporates and so on, leading to a possibility that favorable magnetic characteristics cannot be obtained. The solution treatment time is more preferably set to fall within a range of 1 to 8 hours, and is further preferably set to fall within a range of 1 to 4 hours. It is preferable that the solution treatment is performed in a vacuum or an inert atmosphere such as argon gas in order to prevent oxidation.

Next, the aging treatment is performed on the sintered body after being subjected to the solution treatment. The aging treatment is treatment for controlling the crystal structure and increasing coercive force of the magnet. It is preferable that, in the aging treatment, the sintered body is retained at a temperature of 700 to 900° C. for 0.5 to 80 hours, and after that, it is slowly cooled to a temperature of 400 to 650° C. at a cooling rate of 0.2 to 2° C./minute, and is subsequently cooled to a room temperature. The aging treatment may also be conducted by two-stage heat treatment. Specifically, the aforementioned heat treatment is set to first-stage treatment, and after that, as second-stage heat treatment, the sintered body is retained at a predetermined temperature for a certain period of time, and then is subsequently cooled to a room temperature by furnace cooling. It is preferable that the aging treatment is performed in a vacuum or an inert gas atmosphere such as argon gas in order to prevent oxidation.

When the aging treatment temperature is less than 700° C. or over 900° C., there is a possibility that a homogenous mixed structure of the cell phase and the cell wall phase cannot be obtained, and magnetic characteristics of the permanent magnet decrease. The aging treatment temperature is more preferably 750 to 880° C., and is further preferably 780 to 850° C. If the aging treatment time is less than 0.5 hours, the precipitation of cell wall phase from the 1-7 phase may not be sufficiently completed. On the other hand, if the retention time exceeds 80 hours, there is a possibility that the volume ratio of the cell phase decreases due to the increase in thickness of the cell wall phase, and favorable magnetic characteristics cannot be obtained since the crystal grain becomes coarse. The aging treatment time is more preferably 4 to 60 hours, and is further preferably 8 to 40 hours.

When the cooling rate after the aging treatment is less than 0.2° C./minute, there is a possibility that the volume ratio of the cell phase decreases due to the increase in thickness of the cell wall phase, and favorable magnetic characteristics cannot be obtained since the crystal grain becomes coarse. When the cooling rate after the aging treatment exceeds 2° C./minute, there is a possibility that a homogenous mixed structure of the cell phase and the cell wall phase cannot be obtained, and magnetic characteristics of the permanent magnet decrease. The cooling rate after the aging treatment is more preferably in a range of 0.4 to 1.5° C./minute, and is further preferably in a range of 0.5 to 1.3° C./minute.

Note that the aging treatment is not limited to the two-stage heat treatment, and as the aging treatment, a larger number of stages of heat treatment may be conducted, and further, the performance of multi-stage cooling is also effective. Further, as pre-treatment of the aging treatment, the performance of preliminary aging treatment at a temperature lower than that in the aging treatment for a period of time shorter than that in the aging treatment (preliminary aging treatment) is also effective. Accordingly, the improvement in squareness of a magnetization curve can be expected. Concretely, by setting such that the temperature in the preliminary aging treatment is 600 to 750° C., the treatment time is 0.5 to 4 hours, and the slow cooling rate after the treatment is 0.5 to 1.5° C./minute, the improvement in squareness of the permanent magnet can be expected.

The permanent magnet of this embodiment can be used for various motors or generators. Further, the permanent magnet can also be used as a stationary magnet or a variable magnet in a variable magnetic flux motor or a variable magnetic flux generator. By using the permanent magnet of this embodiment, various motors or generators are structured. When the permanent magnet of this embodiment is applied to the variable magnetic flux motor, techniques well-known to the public can be applied to the structure and the drive system of the variable magnetic flux motor.

Figure 7:
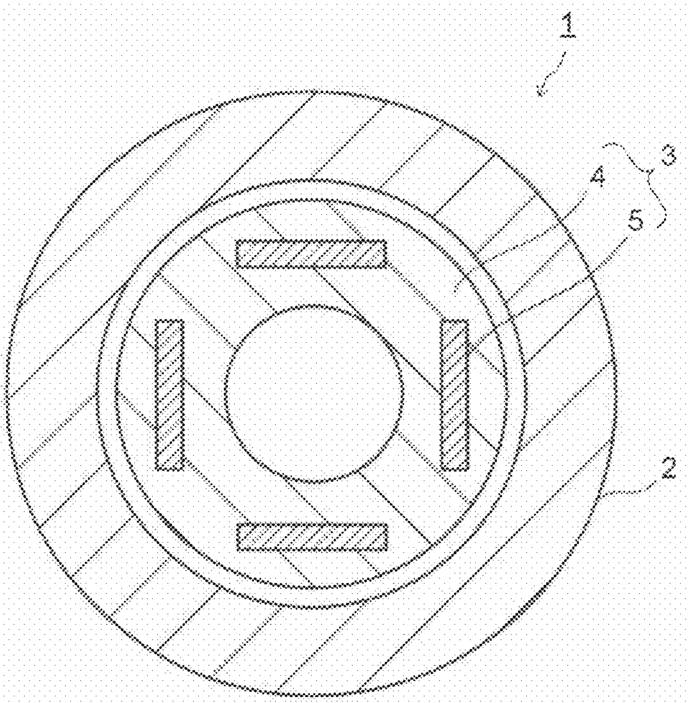
FIG. 7 is a diagram illustrating a permanent magnet motor of the embodiment.

Next, a motor and a generator of the embodiment will be described with reference to the drawings. FIG. 7 illustrates a permanent magnet motor according to the embodiment. In a permanent magnet motor 1 illustrated in FIG. 7, a rotor 3 is disposed in a stator 2. In an iron core 4 in the rotor 3, there is disposed a permanent magnet 5 of the embodiment. Based on the characteristics of the permanent magnet of the embodiment and the like, it is possible to achieve high efficiency, size reduction, cost reduction and the like of the permanent magnet motor 1.

Figure 8:
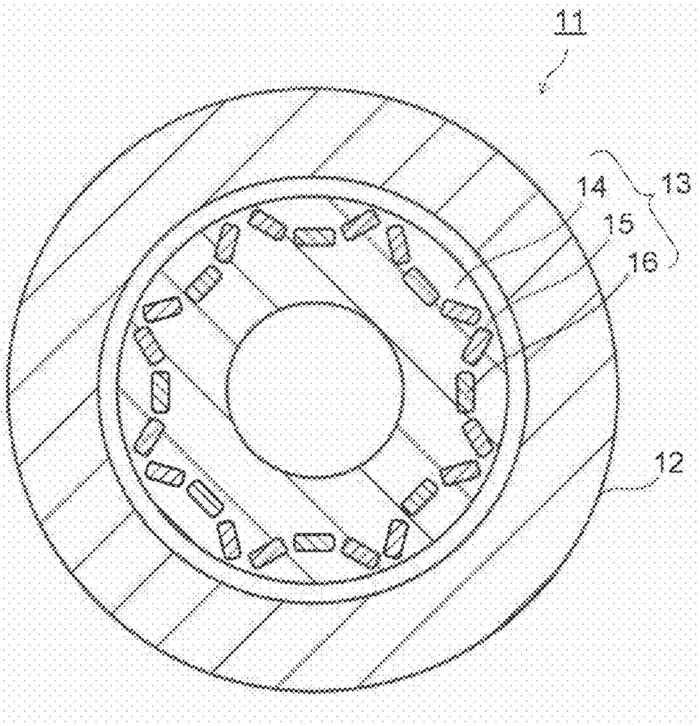
FIG. 8 is a diagram illustrating a variable magnetic flux motor of the embodiment.

FIG. 8 illustrates a variable magnetic flux motor according to the embodiment. In a variable magnetic flux motor 11 illustrated in FIG. 8, a rotor 13 is disposed in a stator 12. In an iron core 14 in the rotor 13, there are disposed the permanent magnets of the embodiment as a stationary magnet 15 and a variable magnet 16. It is possible to change the magnetic flux density (magnetic flux amount) of the variable magnet 16. The variable magnet 16 has a magnetization direction orthogonal to a Q-axis direction, and hence is not affected by Q-axis current and can be magnetized by D-axis current. In the rotor 13, a magnetized winding (not illustrated) is provided. It is structured that application of current from a magnetization circuit to this magnetized winding causes the magnetic field thereof to directly act on the variable magnet 16.

According to the permanent magnet of the embodiment, by changing various conditions of the aforementioned manufacturing method, it is possible to obtain the stationary magnet 15 with coercive force exceeding 500 kA/m and the variable magnet 16 with coercive force of equal to or less than 500 kA/m, for example. Note that in the variable magnetic flux motor 11 illustrated in FIG. 8, although the permanent magnet of the embodiment can be used for both of the stationary magnet 15 and the variable magnet 16, the permanent magnet of the embodiment may be used for either one of the magnets. The variable magnetic flux motor 11, which can output a large torque by a small device size, is suitable for a motor for a hybrid vehicle, an electric vehicle or the like in which high power and downsizing of a motor is required.

Figure 9:
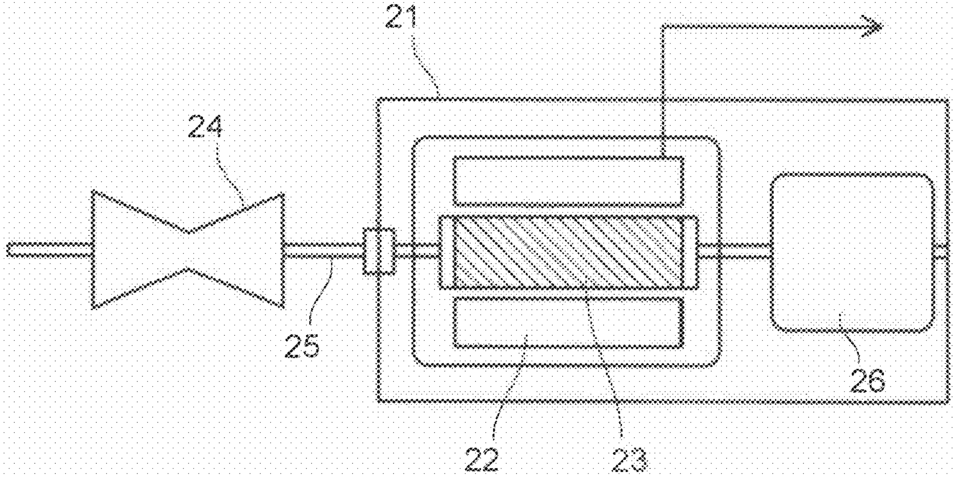
FIG. 9 is a diagram illustrating a permanent magnet generator of the embodiment.

FIG. 9 illustrates a generator according to the embodiment. A generator 21 illustrated in FIG. 9 includes a stator 22 using the permanent magnet of the embodiment. A rotor 23 disposed inside the stator 22 is connected to a turbine 24 provided on one end of the generator 21 via a shaft 25. The turbine 24 rotates by fluid supplied from the outside, for example. Note that, instead of using the turbine 24 rotated by fluid, it is also possible to rotate the shaft 25 by transmitting dynamic rotation such as regenerated energy of a vehicle. For the stator 22 and the rotor 23, various publicly-known structures may be employed.

The shaft 25 is in contact with a commutator (not illustrated) disposed on the other side of the turbine 24 with respect to the rotor 23, and electromotive force generated by rotation of the rotor 23 is increased to system voltage via an isolated phase bus and a main transformer (not illustrated) and transmitted as output of the generator 21. As the generator 21, either of a normal generator and a variable magnetic flux generator can be used. Note that in the rotor 23, charge by static electricity from the turbine 24 and charge by shaft current accompanying power generation occur. Accordingly, the generator 21 has a brush 26 for discharging the charge on the rotor 23.

Next, examples and evaluation results thereof will be described.

EXAMPLE 1

Respective materials were weighed to prepare a composition represented in Table 1, and then arc melted in an Ar gas atmosphere to make an alloy ingot. A differential thermal analysis was performed on the alloy ingot, and a melting start temperature $T_M$ of a Zr-rich phase was determined in accordance with the aforementioned method. For the measurement, a differential thermal analyzer•TGD7000 manufactured by ULVAC-RIKO, Inc. was used, a measurement temperature range was from a room temperature to 1650° C., a heating rate was set to 10° C./minute, and an Ar gas atmosphere (flow rate: 100 mL/minute) was employed. An amount of sample was set to approximately 300 mg, alumina was used as a container, and alumina was used as reference. A temperature $T_M$ of the alloy ingot is represented in Table 2.

Next, the above-described alloy ingot was coarsely grinded, and further pulverized in a jet mill, thereby preparing an alloy powder. This alloy powder was pressed in a magnetic field to make a pressed powder body, and thereafter, the pressed powder body was sintered in an Ar gas atmosphere for 2 hours at a temperature $T_S$ represented in Table 2, and subsequently heat-treated (solution-treated) for 3 hours at 1130° C., thereby making a sintered body. The obtained sintered body was retained at 790° C. for 40 hours, and then cooled to a room temperature, thereby obtaining a sintered magnet as a target. A composition of the sintered magnet is as represented in Table 1. The composition of each magnet was checked by an ICP method. Further, an Fe concentration and a Cu concentration in a main phase, and a volume ratio of a Cu-M rich phase were measured in accordance with the aforementioned methods. Further, magnetic characteristics of the sintered magnet were evaluated using a BH tracer to measure coercive force and residual magnetization. Results thereof are represented in Table 2.

EXAMPLES 2 to 7

Sintered magnets were made similarly to the example 1, except that compositions represented in Table 1 are applied. A sintering temperature $T_S$ of each example was set after determining a melting start temperature $T_M$ of a Zr-rich phase in a similar manner to the example 1. An Fe concentration and a Cu concentration in a main phase, and a volume ratio of a Cu-M rich phase were measured in accordance with the aforementioned methods. Further, magnetic characteristics of the sintered magnets were evaluated using a BH tracer to measure coercive force and residual magnetization. Results thereof are represented in Table 2.

COMPARATIVE EXAMPLE 1

A sintered magnet was made using an alloy powder having the same composition as that of the example 1, under the same condition as that of the example 1, except that the sintering temperature is changed to a temperature represented in Table 2. In a comparative example 1, the sintering temperature $T_S$ was set to a temperature equal to or more than the melting start temperature $T_M$ of the Zr-rich phase. An Fe concentration and a Cu concentration in a main phase, and a volume ratio of a Cu-M rich phase were measured in accordance with the aforementioned methods. Further, magnetic characteristics of the sintered magnet were evaluated using a BH tracer to measure coercive force and residual magnetization. Results thereof are represented in Table 2.

COMPARATIVE EXAMPLES 2, 3

Sintered magnets were made similarly to the example 1, except that compositions represented in Table 1 are applied. In a comparative example 2, an Fe concentration in the composition of alloy was set to less than 28 atomic %, and in a comparative example 3, an Sm concentration in the composition of alloy was set to less than 10 atomic %. An Fe concentration and a Cu concentration in a main phase, and a volume ratio of a Cu-M rich phase were measured in accordance with the aforementioned methods. Further, magnetic characteristics of the sintered magnets were evaluated using a BH tracer to measure coercive force and residual magnetization. Results thereof are represented in Table 2.

TABLE 1

| | Magnet composition (atomic %) |
|---|---|
| Example 1 | $Sm_{11.43}Fe_{30.11}Zr_{1.86}Cu_{4.87}Co_{51.73}$ |
| Example 2 | $Sm_{11.43}Fe_{30.11}Zr_{1.86}Cu_{4.87}Co_{51.73}$ |
| Example 3 | $Sm_{11.43}Fe_{30.11}Zr_{1.86}Cu_{4.87}Co_{51.73}$ |
| Example 4 | $Sm_{11.43}Fe_{30.11}Zr_{1.24}Cu_{4.87}Co_{52.35}$ |
| Example 5 | $(Sm_{0.9}Nd_{0.1})_{11.23}Fe_{29.48}Zr_{2.04}Cu_{5.06}Co_{52.19}$ |
| Example 6 | $Sm_{11.90}Fe_{28.20}(Zr_{0.9}Ti_{0.1})_{2.20}Cu_{7.05}Co_{50.65}$ |
| Example 7 | $Sm_{11.63}Fe_{33.58}Zr_{2.39}Cu_{5.39}Mn_{0.18}Co_{46.83}$ |
| Comparative Example 1 | $Sm_{11.43}Fe_{30.11}Zr_{1.86}Cu_{4.87}Co_{51.73}$ |
| Comparative Example 2 | $Sm_{11.43}Fe_{24.80}Zr_{1.86}Cu_{4.87}Co_{57.04}$ |
| Comparative Example 3 | $Sm_{9.80}Fe_{30.68}Zr_{1.89}Cu_{4.96}Co_{52.67}$ |

TABLE 2

| | Sintering condition | | | Main phase | | Volume | | |
|---|---|---|---|---|---|---|---|---|
| | $T_M$ (° C.) | $T_M$ − 50 (° C.) | $T_s$ (° C.) | Fe concentration (mol %) | Cu Concentration (mol %) | ratio of Cu-Mrich phase (%) | Coercive force (kA/m) | Residual magnetization (T) |
| Example 1 | 1190 | 1140 | 1175 | 32.1 | 5.5 | 1.9 | 1100 | 1.19 |
| Example 2 | 1190 | 1140 | 1160 | 32.2 | 5.7 | 1.6 | 1210 | 1.20 |
| Example 3 | 1190 | 1140 | 1185 | 31.1 | 5.3 | 7.6 | 980 | 1.17 |
| Example 4 | 1190 | 1140 | 1160 | 32.2 | 5.8 | 1.2 | 1110 | 1.22 |
| Example 5 | 1180 | 1130 | 1175 | 30.5 | 5.4 | 3.5 | 1380 | 1.18 |
| Example 6 | 1195 | 1145 | 1175 | 28.9 | 6.0 | 3.3 | 1750 | 1.17 |
| Example 7 | 1175 | 1125 | 1175 | 34.5 | 5.3 | 3.7 | 1020 | 1.23 |
| Comparative Example 1 | 1190 | 1140 | 1230 | 30.5 | 3.6 | 11.2 | 210 | 1.15 |
| Comparative Example 2 | 1195 | 1145 | 1175 | 25.1 | 5.4 | 1.6 | 1610 | 1.11 |
| Comparative Example 3 | 1190 | 1140 | 1175 | 30.1 | 5.2 | 2.2 | 110 | 1.08 |

and a volume ratio of a Cu-M rich phase were measured in accordance with the aforementioned methods. Further, magnetic characteristics of the sintered magnets were evaluated using a BH tracer to measure coercive force and residual magnetization. Results thereof are represented in Table 2.

As is apparent from Table 2, it can be understood that each of the sintered magnets in the examples 1 to 7 has high magnetization and high coercive force, and thus is excellent in magnetic characteristics. Note that from the comparison between the examples 1, 2 and the example 3, it can be understood that the volume fraction of the Cu-M rich phase is preferably 50 or less. Since the sintered magnet of the comparative example 1 has the low Cu concentration in the main phase, it cannot obtain sufficient coercive force. In the comparative example 2, the magnetization is low due to the low Fe concentration. In the comparative example 3, both of the coercive force and the magnetization are low due to the low Sm concentration.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A permanent magnet, comprising: a composition represented by the following composition formula:

$$R_pFe_qM_rCu_sCo_{100-p-q-r-s}$$

wherein R is at least one element selected from the group consisting of rare earth elements, M is at least one element selected from the group consisting of Zr, Ti and Hf, p is a number satisfying 10 atomic % ≤p ≤13.5 atomic %, q is a number satisfying 28 atomic % ≤q ≤40 atomic %, r is a number satisfying 0.88 atomic % ≤r ≤7.2 atomic %, s is a number satisfying 4 atomic % ≤s ≤13.5 atomic %, a metallic structure in which a composition region having an Fe concentration of 28 mol % or more is a main phase of a plurality of phases, wherein a Cu concentration in the main phase is 5 mol % or more, wherein the metallic structure includes a Cu-M rich phase having 5 mol % or more of a Cu concentration and 3 mol % or more of a concentration of the element M.

2. The permanent magnet according to claim 1, wherein a volume ratio of the Cu-M rich phase in the metallic structure is in a range of 0.01 to 5%.

3. The permanent magnet according to claim 1, wherein the main phase includes a $Th_2Zn_{17}$ crystal phase, and a grain boundary phase having a Cu molar concentration which is 1.2 times or more a Cu molar concentration in the $Th_2Zn_{17}$ crystal phase.

4. The permanent magnet according to claim 1, wherein 50 atomic % or more of the element R is Sm, and 50 atomic % or more of the element M is Zr.

5. A motor comprising the permanent magnet according to claim 1.

6. A generator comprising the permanent magnet according to claim 1.

7. A method for manufacturing a permanent magnet, comprising:

preparing an alloy powder having the following composition represented by a composition formula:

$$R_pFe_qM_rCu_sCo_{100-p-q-r-s}$$

wherein R is at least one element selected from the group consisting of rare earth elements, M is at least one element selected from the group consisting of Zr, Ti and Hf, p is a number satisfying 10 atomic % ≤p ≤13.5 atomic %, q is a number satisfying 28 atomic % ≤q ≤40 atomic %, r is a number satisfying 0.88 atomic % ≤r ≤7.2 atomic %, s is a number satisfying 4 atomic % ≤s ≤13.5 atomic %, press-forming the alloy powder in a magnetic field to form a pressed powder body;

sintering the pressed powder body at a temperature Ts to form a sintered body;

performing a solution treatment to the sintered body; and performing an aging treatment to the sintered body after the solution treatment, wherein the alloy powder contains a M-rich phase, and the temperature Ts satisfies $T_M$-50<Ts<$T_m$, wherein $T_M$ is a melting start temperature (° C.) of the M-rich phase, wherein the sintered body after the aging treatment includes a metallic structure comprising a plurality of phases in which a composition region having an Fe concentration of 28 mol % or more and a Cu concentration of 5 mol % or more is a main phase, and wherein the metallic structure includes a Cu-M rich phase having 5 mol % or more of a Cu concentration and 3 mol % or more of a concentration of the element M.

8. The manufacturing method according to claim 7, wherein a volume ratio of the Cu-M rich phase in the metallic structure is in a range of 0.01to 5%.

9. The manufacturing method according to claim 7, wherein the aging treatment is performed at a temperature of from 700 to 900° C. for from 4 to 80 hours.

10. The manufacturing method according to claim 7, wherein the aging treatment is performed at a temperature of from 700 to 900° C. for more than 8 hours and 60 hours or less.

11. The manufacturing method according to claim 7, wherein the temperature $T_s$ is in a range of from 1160 to 1185° C.

12. A permanent magnet, comprising: a composition represented by the following composition formula:

$$R_pFe_qM_rCu_s(Co_{1-t}A_t)_{100-p-q-r-s}$$

wherein R is at least one element selected from the group consisting of rare earth elements, M is at least one element selected from the group consisting of Zr, Ti and Hf, A is at least one element selected from the group consisting of Ni, V, Cr, Mn, Al, Ga, Nb, Ta and W, p is a number satisfying 10 atomic % ≤p ≤13.5 atomic %, q is a number satisfying 28 atomic % ≤q ≤40 atomic %, r is a number satisfying 0.88 atomic % ≤r ≤7.2 atomic %, s is a number satisfying 4 atomic % ≤s ≤13.5 atomic %, t is a number satisfying 0 atomic % ≤s ≤0.2 atomic %, a metallic structure in which a composition region having an Fe concentration of 28 mol % or more is a main phase of a plurality of phases, wherein a Cu concentration in the main phase is 5 mol % or more, wherein the metallic structure includes a Cu-M rich phase having 5 mol % or more of a Cu concentration and 3 mol % or more of a concentration of the element M.

13. The permanent magnet according to claim 12, wherein a volume ratio of the Cu-M rich phase in the metallic structure is in a range of 0.01 to 5%.

* * * * *